United States Patent
Aota et al.

(10) Patent No.: US 8,040,009 B2
(45) Date of Patent: Oct. 18, 2011

(54) FILED ELEMENT

(75) Inventors: Keiji Aota, Shiga (JP); Yoshinari Asano, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 247 days.

(21) Appl. No.: 12/531,234

(22) PCT Filed: Mar. 13, 2008

(86) PCT No.: PCT/JP2008/054631
§ 371 (c)(1),
(2), (4) Date: Sep. 14, 2009

(87) PCT Pub. No.: WO2008/114692
PCT Pub. Date: Sep. 25, 2008

(65) Prior Publication Data
US 2010/0109467 A1    May 6, 2010

(30) Foreign Application Priority Data

Mar. 15, 2007 (JP) .................. 2007-066526
Mar. 5, 2008 (JP) .................. 2008-055032

(51) Int. Cl.
*H02K 1/27* (2006.01)
(52) U.S. Cl. ................................ 310/156.38
(58) Field of Classification Search .......... 310/156.38, 310/156.4–156.45, 156.53, 156.564
See application file for complete search history.

(56) References Cited

U.S. PATENT DOCUMENTS

| | | | |
|---|---|---|---|
| 6,703,743 B2 * | 3/2004 | Kaneko et al. | 310/156.38 |
| 6,849,981 B2 * | 2/2005 | Kojima et al. | 310/156.43 |
| 6,936,945 B2 * | 8/2005 | Murakami et al. | 310/156.56 |
| 7,119,507 B2 * | 10/2006 | Nishijima | 318/400.41 |
| 7,230,359 B2 * | 6/2007 | Iles-Klumpner | 310/156.53 |
| 7,362,025 B2 | 4/2008 | Utaka | |
| 2006/0055266 A1 * | 3/2006 | Iwami et al. | 310/156.47 |

FOREIGN PATENT DOCUMENTS

| | | |
|---|---|---|
| CN | 1676726 A | 10/2005 |
| JP | 2000-232741 A | 8/2000 |
| JP | 2004-274826 A | 9/2004 |
| JP | 2004-328963 A | 11/2004 |
| JP | 3690067 B2 | 8/2005 |
| JP | 2005-261169 A | 9/2005 |
| JP | 2005-279275 A | 10/2005 |
| JP | 2005-341655 A | 12/2005 |
| JP | 2005-354899 A | 12/2005 |
| JP | 2006-109700 A | 4/2006 |

* cited by examiner

*Primary Examiner* — Tran Nguyen
(74) *Attorney, Agent, or Firm* — Birch, Stewart, Kolasch & Birch, LLP (57) ABSTRACT

The field magnet is formed of, for example, two permanent magnets, and a width of the field magnet increases from a center toward both ends thereof in a monotonically non-decreasing manner. The field magnet includes, at the both ends thereof, projecting portions projecting to a side opposite to a rotation axis. The field core includes a penetration hole through which the field magnet is caused to penetrate. The penetration hole includes penetration surfaces which cover magnetic pole surfaces of the field magnet, respectively. Specifically, the penetration surface includes concave portions with which the projecting portions are fitted. When the field magnet is inserted, the penetration surfaces serve as a guide which guides the field magnet, and accordingly the field magnet can be caused to penetrate through the penetration hole with ease.

8 Claims, 12 Drawing Sheets

FILED ELEMENT

TECHNICAL FIELD

The present invention relates to a field element, and more particularly, to a field element used in interior magnet motor.

BACKGROUND ART

Patent Document 1 discloses a rotor in which permanent magnets each composed of a plurality of unit magnets are inserted into insertion holes.

Technologies related to the present invention are disclosed in Patent Document 2 and Patent Document 3.

Patent Document 1: Japanese Patent No. 3690067
Patent Document 2: Japanese Patent Application Laid-Open No. 2005-261169
Patent Document 3: Japanese Patent Application Laid-Open No. 2004-328963

DISCLOSURE OF INVENTION

Problem to be Solved by the Invention

However, in the technology described in Patent Document 1, there is a possibility that, for example, the unit magnet may be obliquely inserted into the insertion hole when being inserted into the insertion hole because a volume of the insertion hole is several times larger than that of the unit magnet. In this case, there is a possibility that the following unit magnet may interfere with the obliquely inserted unit magnet when being inserted into the insertion hole, and therefore a desired number of permanent unit magnets may not be inserted into the insertion hole. As a result, there is a fear that a decrease in productivity may be caused.

It is therefore an object of the present invention to provide a field element which has high productivity.

Means to Solve the Problem

According to a first aspect of the present invention, a field element includes: a field magnet (5) including a first magnetic pole surface (5a) having a first polarity on a rotation axis (P) side and a second magnetic pole surface (5b) having a second polarity on a side opposite to the rotation axis, in which a width being a distance between the first magnetic pole surface and the second magnetic pole surface increases in a monotonically non-decreasing manner along a longitudinal direction from a center of the first magnetic pole surface toward both ends of the first magnetic pole surface in cross section perpendicular to the rotation axis, the first magnetic pole surface (5a) and the second magnetic pole surface (5b) being formed of three or less permanent magnets (51, 52) in the cross section; and a field core (2) including a penetration hole (4) including a first penetration surface (4a) which covers the first magnetic pole surface (5a) and a second penetration surface (5b) which covers the second magnetic pole surface (5b).

According to a second aspect of the field element of the present invention, in the field element according to the first aspect, the field magnet is formed of a plurality of the permanent magnets; and a boundary between the plurality of the permanent magnets forming the field magnet is positioned between the both ends.

According to a third aspect of the field element of the present invention, in the field element according to the first aspect or the second aspect, the field magnet is divided into a plurality of the permanent magnets in a direction of the rotation axis.

According to a fourth aspect of the field element of the present invention, a field element, including: a field ma et including a first magnetic pole surface having a first polarity on a rotation axis side and a second magnetic pole surface having a second polarity on a side opposite to said rotation axis, in which a width being a distance between said first magnetic pole surface and said second magnetic pole surface increases in a monotonically non-decreasing manner along a longitudinal direction from a center of said first magnetic pole surface toward both ends of said first magnetic pole surface in cross section perpendicular to said rotation axis, said first magnetic pole surface and said second magnetic pole surface being formed of one permanent magnet in said cross section; and a field core including a penetration hole including a first penetration surface which covers said first magnetic pole surface and a second penetration surface which covers said second magnetic pole surface.

According to a fifth aspect of the field element of the present invention, in the field element according to any one of the first to fourth aspects, the second magnetic pole surface (5b) includes projecting portions (51a, 52a) projecting toward a side opposite to the rotation axis at end portions in the longitudinal direction and increasing the width of the field magnet; and the second penetration surface (4b) includes concave portions (41a, 41b) being fitted with the projecting portions (51a, 52a).

According to a sixth aspect of the field element of the present invention, in the field element according to any one of the first to fifth aspects, the penetration hole further extends to a side opposite to the field magnet from the first penetration surface (4a) and the second penetration surface (4b).

Effects of the Invention

According to the first aspect of the field element of the present invention, the first penetration surface and the second penetration surface cover the first magnetic pole surface and the second magnetic pole surface of the field magnet, respectively, whose width to the longitudinal direction increases in the monotonically non-decreasing manner from the center toward the both ends thereof. Accordingly, the first penetration surface and the second penetration surface serve as the guide when the field magnet is caused to penetrate through the penetration hole, and the penetration is made easier, with the result that productivity of the field element is improved.

According to the second aspect of the field element of the present invention, there can be made contribution to realizing the field element according to the first aspect.

According to the third aspect of the field element of the present invention, accuracy required for the field magnet can be reduced, whereby a manufacturing cost can be reduced.

According to the fourth aspect of the field element of the present invention, the width of the field magnet increases in the monotonically non-decreasing manner toward the both ends thereof, and hence demagnetization occurring at the both ends can be suppressed. Further, in the case where the field magnet is formed of a plurality of permanent magnets piercing from one end to the other end along the rotation axis of the field core, gaps are generated between those permanent magnets. According to the present invention, it is possible to prevent the field magnetic flux from decreasing due to the gaps and avoid noise which is caused when the plurality of permanent magnets collide with each other.

According to the fifth aspect of the field element of the present invention, it is possible to improve the interlinkage magnetic flux. In addition, it is possible to suppress the demagnetization occurring at the both ends of the field magnet. Further, there is provided the plane portion whose width is constant along the longitudinal direction, and hence an amount of permanent magnet to be used can be reduced compared with the shape in which the width increases monotonically along the longitudinal direction. Accordingly, the manufacturing cost can be reduced.

According to the sixth aspect of the field element of the present invention, it is possible to reduce the leakage flux of the field magnet owing to the gap which is formed when the penetration hole further extends to the side opposite to the field magnet from the first penetration surface and the second penetration surface. In particular, according to the field element of the sixth aspect according to the field element of the fourth aspect, the field magnet is formed of one permanent magnet, and thus the first magnetic pole surface and the first penetration surface are engaged with each other in the longitudinal direction and serve as the magnet retaining structure for preventing the field magnet from moving in the longitudinal direction. For this reason, it is possible to prevent the permanent magnet from moving in the longitudinal direction even when the surfaces sandwiched between the first magnetic pole surface and the second magnetic pole surface are not fixed for realizing the magnet retaining structure. Accordingly, it is possible to extend the penetration hole to the side opposite to the field magnet directly from the first penetration surface and the second penetration surface without providing the step, with the result that the width of the penetration hole can be increased at the both ends of the field magnet. Therefore, the leakage flux can be prevented more efficiently.

The object, features, aspects, and advantages of the present invention will be more apparent from the following detailed description in conjunction with the drawings.

BEST MODE FOR CARRYING OUT THE INVENTION

Hereinafter, field elements according to embodiments will be described with reference to the attached drawings. Note that like reference numerals are used to designate like or identical members, and overlapping description will be omitted.

First Embodiment

Figure 1:
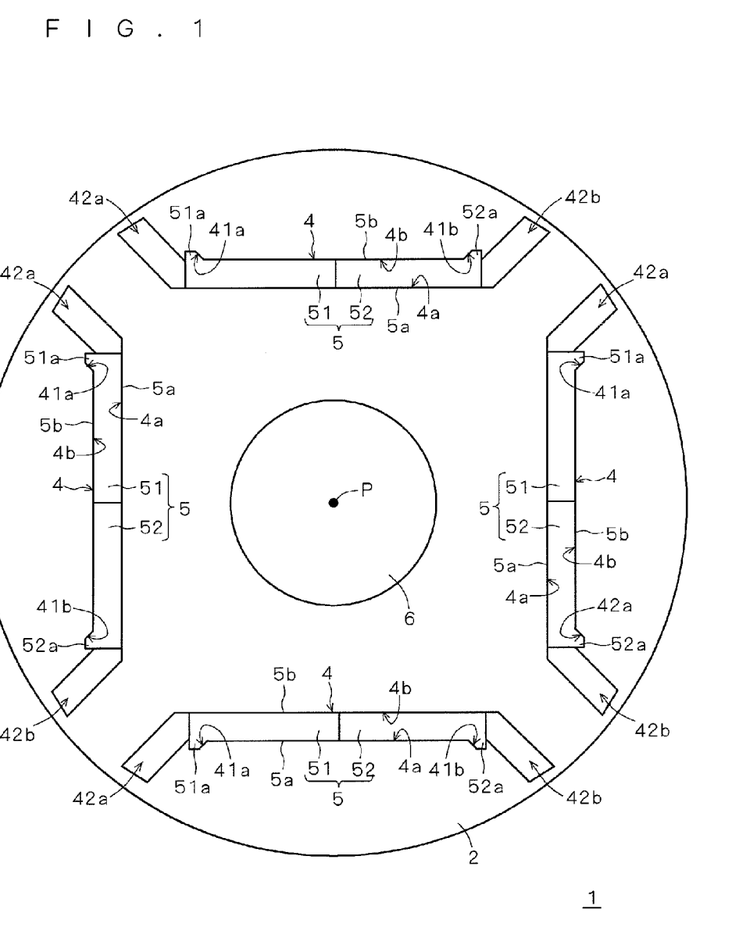
FIG. 1 is a schematic cross-sectional view of a field element according to a first embodiment.

FIG. 1 is a schematic cross-sectional view of a field element according to a first embodiment of the present invention. FIG. 1 shows a schematic configuration of a field element 1 in cross section perpendicular to a rotation axis P. The field element 1 includes a field core 2, field magnets 5 and an end plate (not shown).

As shown in FIG. 1, the field core 2 has a circular perimeter with the rotation axis P being as a center thereof. The field core 2 includes penetration holes 4 and a shaft hole 6 which are formed therein. Note that the field core 2 is formed of a magnetic material and extends in a direction parallel to the rotation axis P (direction perpendicular to the sheet (not shown): hereinafter, referred to as rotation axis direction).

More specifically, in the field core 2, the shaft hole 6 is provided in a region including the rotation axis P, and a shaft (not shown) is disposed in the shaft hole 6 so as to pierce therethrough. Note that the shaft hole 6 can be omitted in a case where the shaft is mounted onto the end plate.

In addition, four penetration holes 4 are circularly disposed in the field core 2 with the rotation axis P being as the center thereof, and each of which extends in the rotation axis direction. However, the penetration holes 4 are not necessarily required to extend in the rotation axis direction, and may extend in a direction inclined to the rotation axis P at a predetermined angle. Note that in this embodiment, description will be given assuming that the penetration holes 4 extend in the direction parallel to the rotation axis P.

The field magnet 5 is caused to penetrate through the penetration hole 4. Note that while FIG. 1 shows the field element 1 in which four field magnets 5 which respectively correspond to four penetration holes 4 are caused to penetrate therethrough (that is, field element 1 which has four poles), the number is not limited to four and may be two, or four or more. Each of the field magnets 5 includes a magnetic pole surface 5a which has a predetermined polarity on the rotation axis P side and a magnetic pole surface 5b which has a polarity different from that of the magnetic pole surface 5a on a side opposite to the rotation axis P. The magnetic pole surfaces 5a of the adjacent field magnets 5 have polarities different from each other.

Hereinafter, the penetration hole 4 and the field magnet 5 will be described more specifically. In the field magnet 5, in cross section perpendicular to the rotation axis P (for example, sheet of FIG. 1), a width which is a distance between the magnetic pole surfaces 5a and 5b (hereinafter, merely referred to as width) increases in a monotonically non-decreasing manner in a longitudinal direction from a center of the magnetic pole surface 5a toward both ends of the magnetic pole surface 5a. That is, the width of the field magnet 5 is the smallest in the center of the magnetic pole surface 5a, the width at least at the both ends of the magnetic pole surface 5a is wider than the width at the center thereof, and the width of the field magnet 5 does not decrease from the center toward the both ends thereof.

As a more specific example, the field magnet 5 has the uniform width from the center toward the both ends of the magnetic pole surface 5a, and the magnetic pole surface 5b includes, at both ends thereof, projecting portions 51a and 52a which project to the side opposite to the rotation axis P so as to increase the width, as shown in FIG. 1. Further, the field magnet 5 is formed of two permanent magnets 51 and 52 in cross section perpendicular to the rotation axis P, and a pair of the permanent magnets 51 and 52 form the magnetic pole surfaces 5a and 5b. A boundary between the permanent magnets 51 and 52 is positioned between the both ends of the field magnet 5 in cross section perpendicular to the rotation axis P.

That is, the field magnet 5 is divided in a substantially circumferential direction of the rotation axis P. In addition, the permanent magnets 51 and 52 include the projecting portions 51a and 52a on one end side thereof, respectively, and form the boundary between the permanent magnets 51 and 52 on the other end side.

The penetration hole 4 includes a penetration surface 4a which covers the magnetic pole surface 5a and a penetration surface 4b which covers the magnetic pole surface 5b. Specifically, the penetration surface 4b includes concave portions 41a and 41b with which the projecting portions 51a and 52a are fitted, respectively. The penetration hole 4 further extends from the penetration surface 4a and the penetration surface 4b toward a side opposite to the field magnet 5. Specifically, the penetration hole 4 includes cavity portions 42a and 42b each extending toward the perimeter of the field core 2 in a continuous manner from the both ends of the field magnet 5. Note that the cavity portions 42a and 42b may be provided separately from the both ends of the field magnet 5, that is, through a thin wall portion of the field core 2.

The end plates (not shown) are disposed at both ends of the field core 2 in the rotation axis direction.

Figure 2:
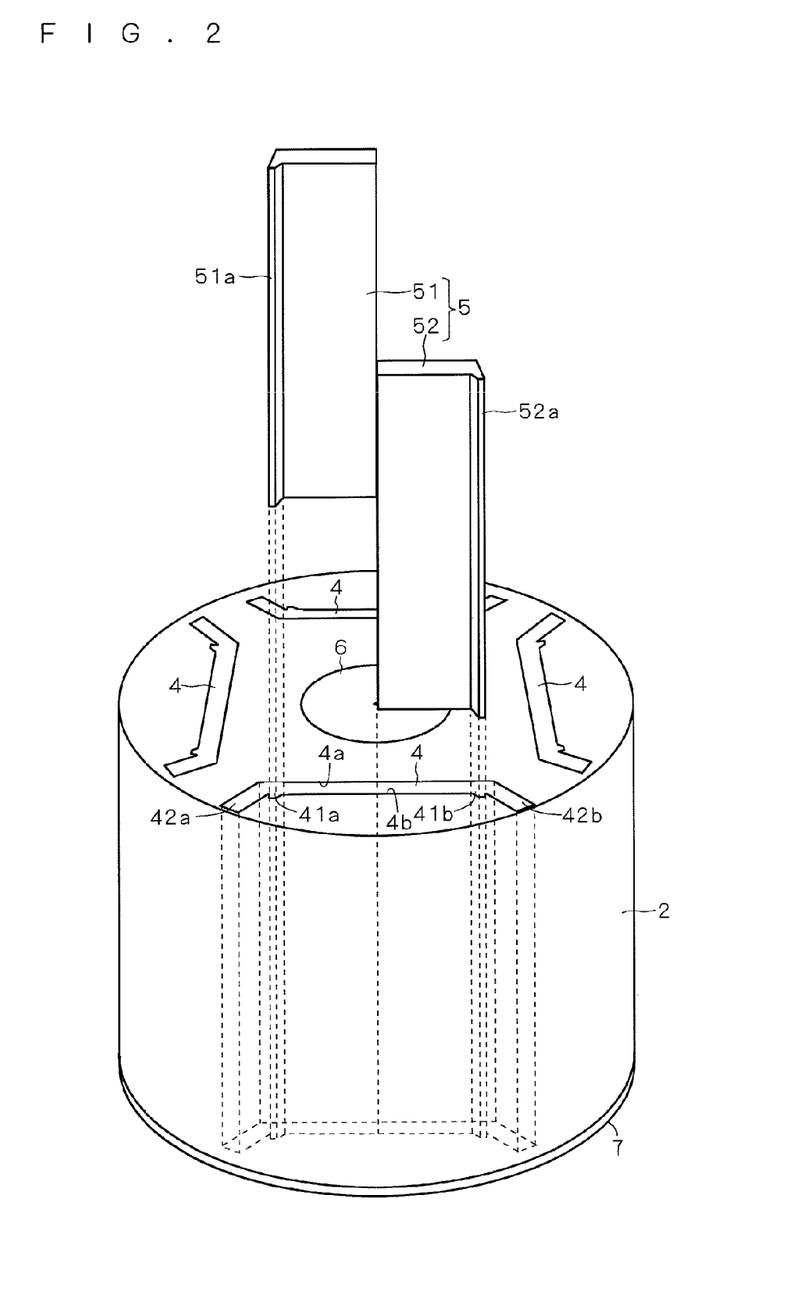
FIG. 2 is a schematic perspective view showing a state when a field magnet is inserted into a penetration hole.

FIG. 2 is a schematic perspective view showing a state in which, in the field element 1, the field magnet 5 is caused to penetrate through the penetration hole 4. An end plate 7 is provided only at one end of the field core 2 in the rotation axis direction, and then, the field magnet 5 is inserted into the penetration hole 4 from the other end side of the field core 2.

First, the permanent magnet 51 is caused to penetrate through the penetration hole 4 while causing the projecting portion 51a to be fitted with the concave portion 41a. On this occasion, the penetration surfaces 4a and 4b (more specifically, concave portion 41a) serve as a guide which guides the permanent magnet 51, whereby the permanent magnet 51 is caused to penetrate at a desired position with respect to the penetration hole 4. In the same manner, the permanent magnet 52 is inserted into the penetration hole 4 while causing the projecting portion 52a to be fitted with the concave portion 41b. That is, the permanent magnet 51 is not positioned in a path into which the permanent magnet 52 is inserted, and thus the permanent magnet 52 can be easily inserted into the penetration hole 4 without being interfered by the permanent magnet 51. As a result, productivity of the field element 1 can be improved. Note that the same goes for a case where the permanent magnet 52 is caused to penetrate through the penetration hole 4, and then the permanent magnet 51 is caused to penetrate therethrough.

Figure 3:
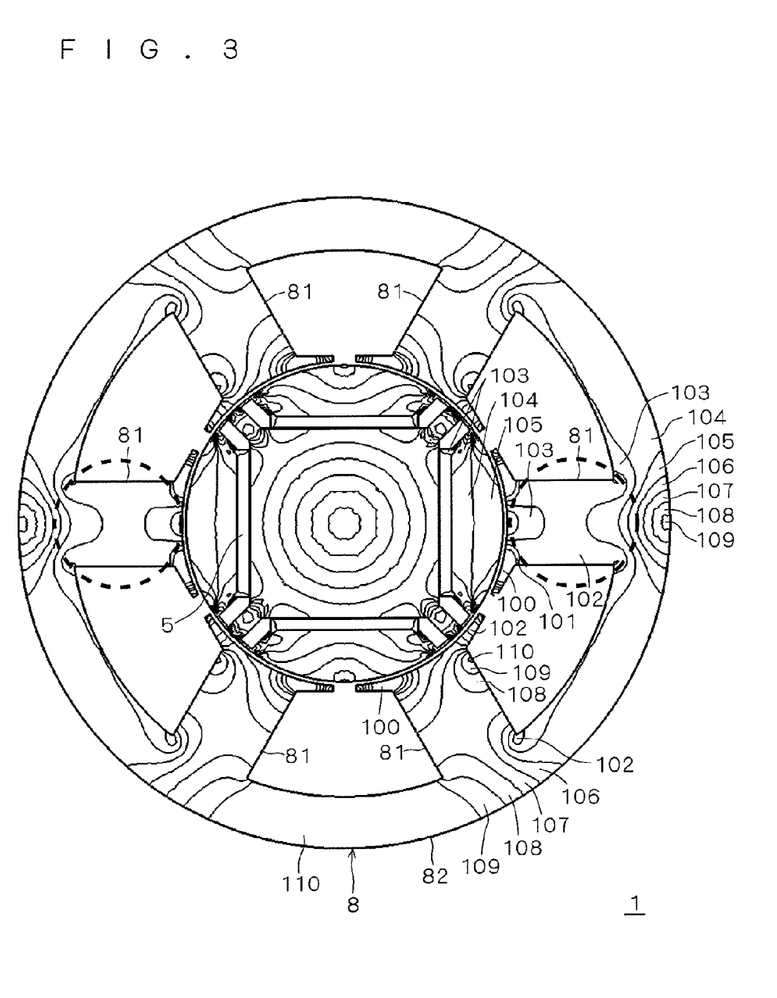
FIG. 3 is a view showing a magnetic flux density of an armature using the field element according to the first embodiment.

Further, interlinkage magnetic flux and demagnetization resistance can be improved in the field element 1. This will be specifically described. FIG. 3 is a view showing a magnetic flux density of a rotating electric machine including the field element 1 and an armature 8. The armature 8 includes, for example, six teeth 81 and a circular yoke 82 which connects one ends of the teeth 81 to each other. The armature 8 is disposed so that the other end side of the teeth 81 is disposed to be opposed to the perimeter of the field element 1. Note that an armature winding is omitted in the drawing for the sake of simplicity of the drawing.

Figure 4:
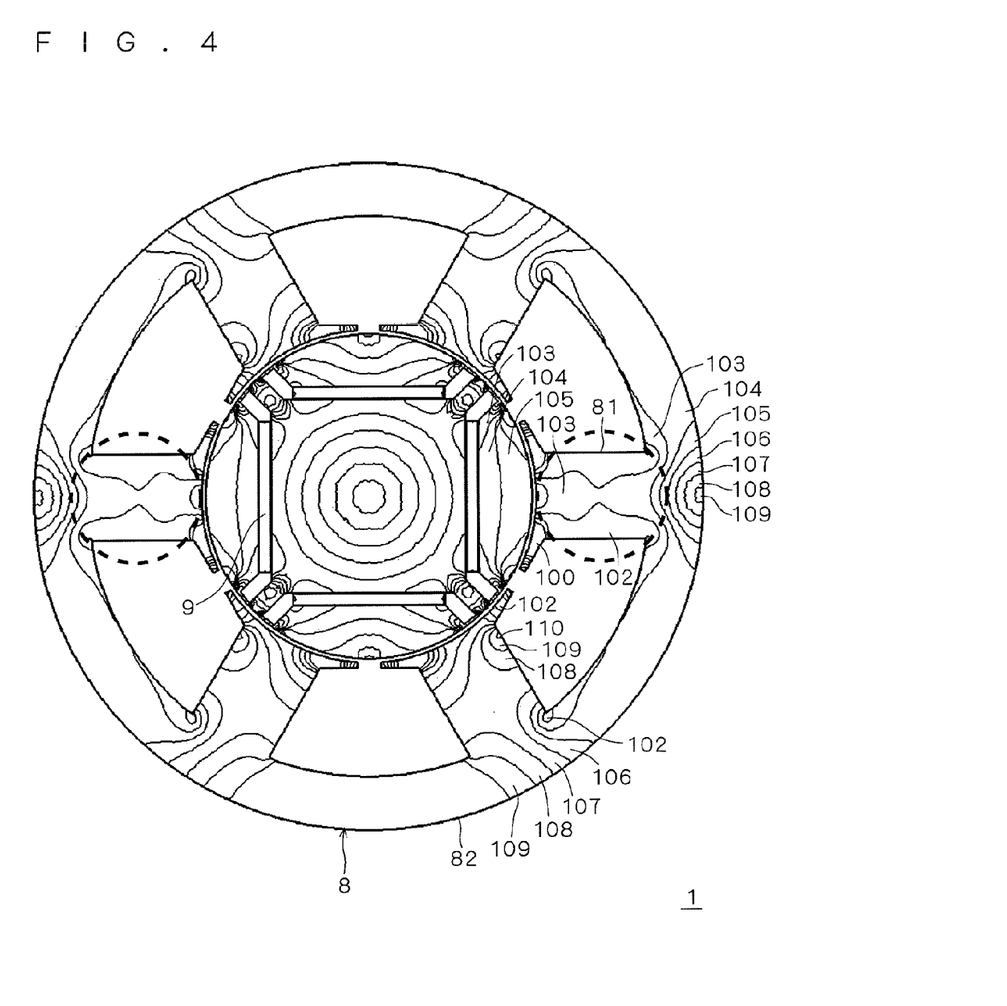
FIG. 4 is a view showing a magnetic flux density of an armature using field element having a uniform width.

FIG. 3 shows a magnetic flux density when one field magnet 5 is opposed to one tooth 81 on a front thereof. For comparison, FIG. 4 shows a magnetic flux density of a rotating electric machine using field magnets 9 which have the uniform width. Note that in FIGS. 3 and 4, the magnetic flux density is indicated by contour lines, and regions sandwiched between the contour lines are denoted by reference numerals 100 to 109. In the regions denoted by the reference numerals 100 to 109, the smaller the reference numeral is, the higher the magnetic flux density is. Note that even in a region which is not denoted by a reference numeral, a magnetic flux density of the region can be known from the symmetry of the field element 1.

As apparent from the comparison of the regions circled by dashed lines in FIG. 3 and FIG. 4, the magnetic flux density of one tooth 81 in the relevant region of the field element 1 is larger compared with the case where the field magnets 9 having the uniform width are used. In other words, according to the field element 1, the interlinkage magnetic flux can be improved.

Figure 5:
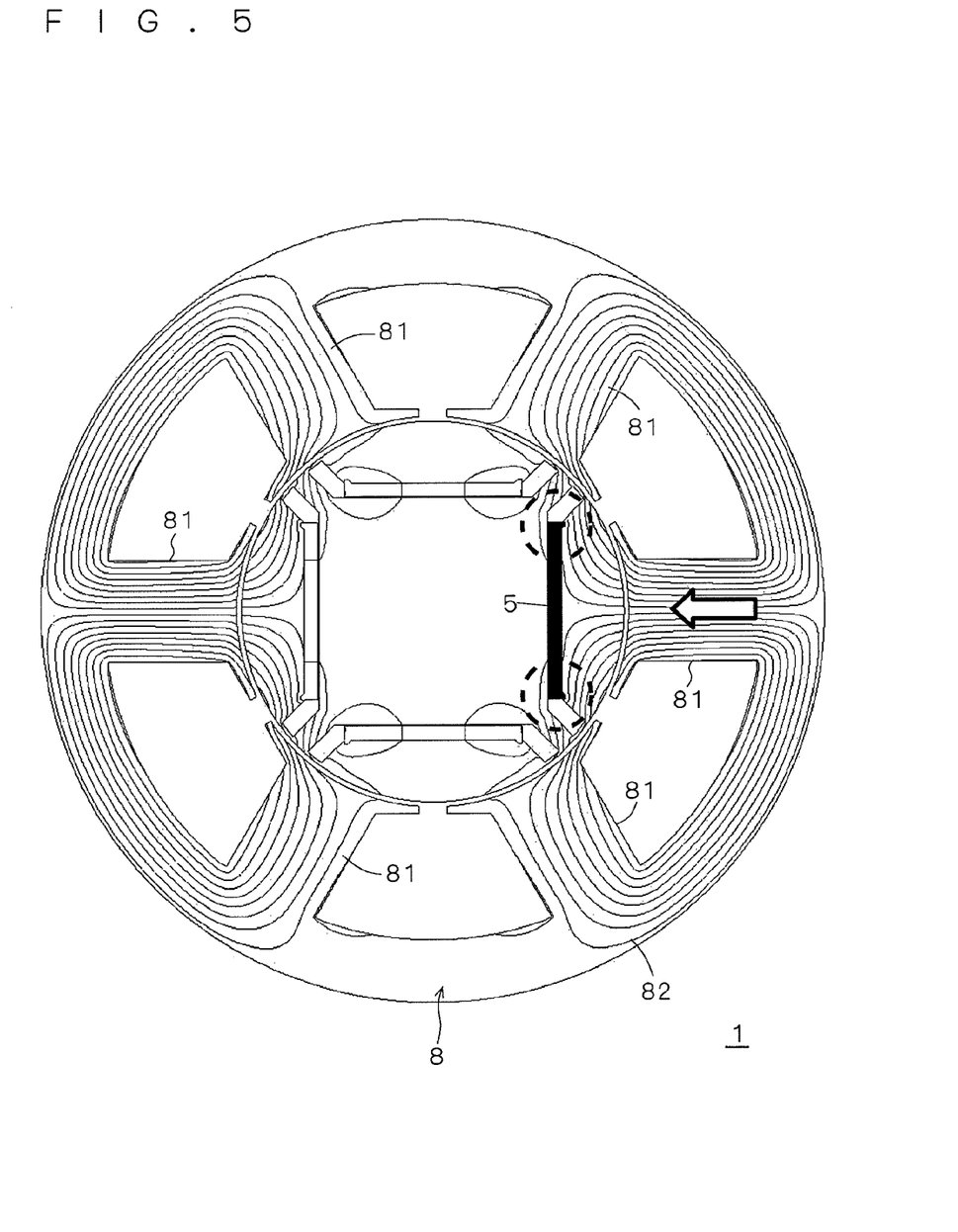
FIG. 5 is a view showing lines of magnetic force of the armature using the field element according to the first embodiment.
Figure 6:
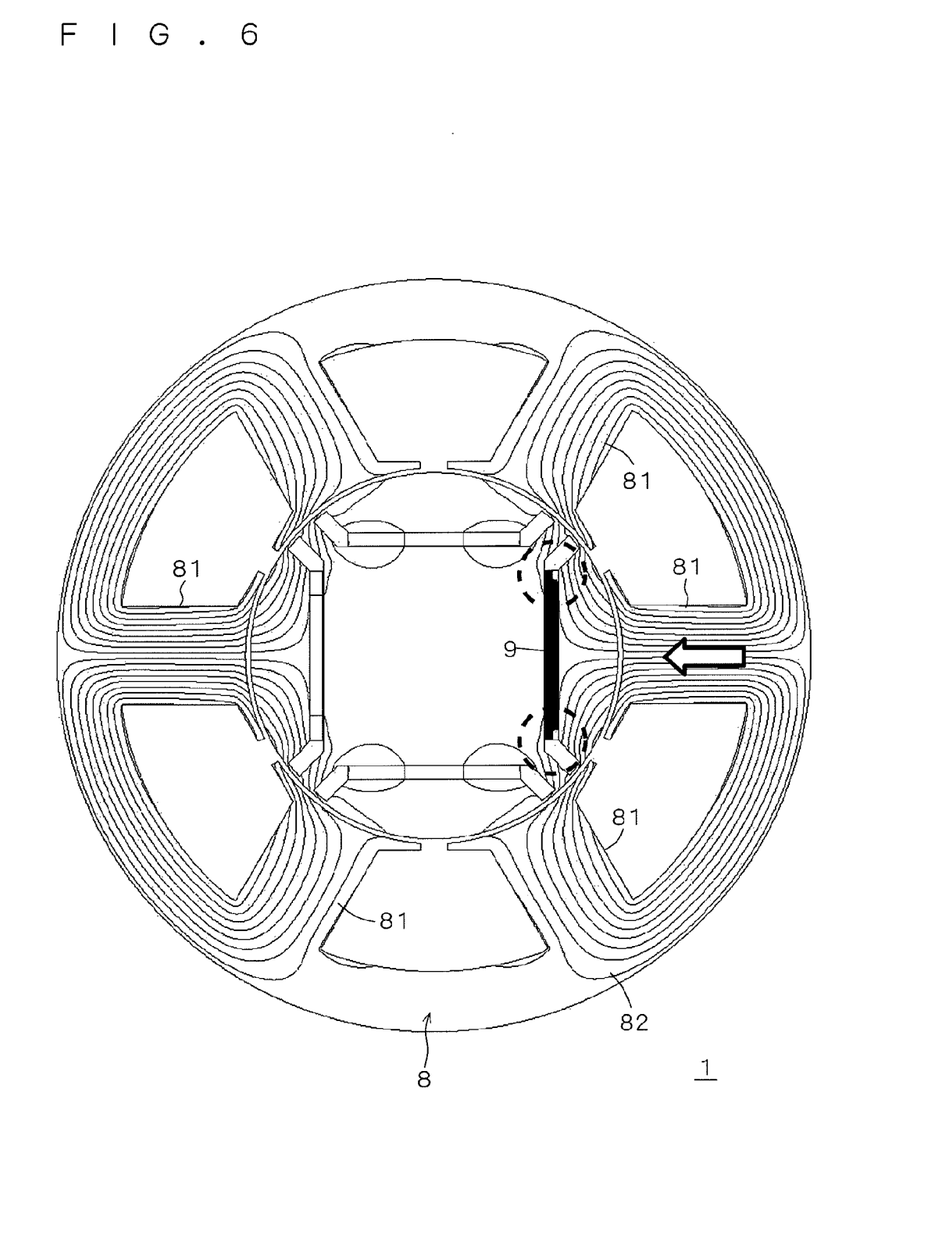
FIG. 6 is a view showing lines of magnetic force of the armature using the field magnet having the uniform width.

FIG. 5 shows lines of magnetic force when an opposing magnetic field is applied by one of the teeth 81 from an outside to one of the field magnets 5. For comparison, FIG. 6 shows lines of magnetic force when the opposing magnetic field is applied to one of the field magnets 9 in the rotating electric machine using the field magnets 9 which have the uniform width. Note that directions in which the opposing magnetic fields are applied to the one field magnet 5 and the one field magnet 9 are indicated by block arrows in FIGS. 5 and 6.

In FIGS. 5 and 6, the magnetic flux densities are each shown in the one field magnet 5 and the one field magnet 9 to which the opposing magnetic field is applied. As shown in FIG. 6, voids at both ends of the one field magnet 9 (see regions circled by dashed lines) indicate that the magnetic flux density is decreased at the both end portions, that is, that demagnetization occurs. On the other hand, as shown in FIG. 5, there are no void portions at the both ends of the one field magnet 5 (see regions circled by dashed lines), and reduction of the magnetic flux density is less, that is, demagnetization is less, compared with the case shown in FIG. 6. In other words, according to the field element 1, demagnetization resistance can be improved.

The permanent magnets 51 and 52 have the same polarity on the magnetic pole surface 5a, and thus the permanent magnets 51 and 52 are applied with a repulsive force in a direction so as to be apart from each other. A gap is formed between the permanent magnets 51 and 52 due to the repulsive force, which causes a decrease in interlinkage magnetic flux. In the field element 1, the gap between the permanent magnets 51 and 52 can be controlled based on positions of the concave portions 41a and 41b, and the gap can be made smaller, whereby it is possible to prevent a decrease in interlinkage magnetic flux.

Figure 7:
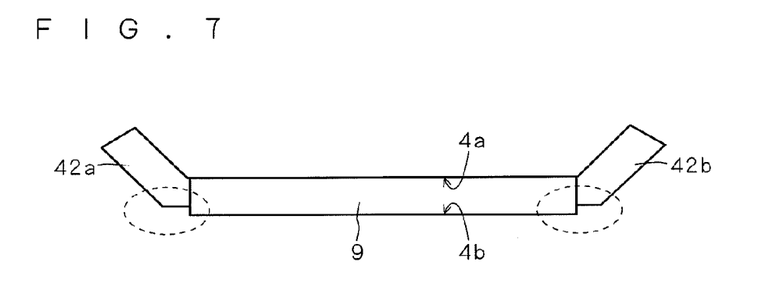
FIG. 7 is a schematic cross-sectional view showing one field magnet and one penetration hole of the field element using the field magnet having the uniform width.

The cavity portions 42a and 42b can reduce, for example, a leakage flux leaking from the magnetic pole surface 5a to the magnetic pole surface 5b. For instance, in the case of the field magnet 9 having the uniform width, the penetration surface 4b generally has a step shape at both ends of the field magnet 9 for preventing the field magnet 9 from moving in the longitudinal direction (see regions circled by dashed lines in FIG. 7). If the width at the center of the field magnet 5 is the same as the width of the field magnet 9, volumes of the cavity portions 42a and 42b can be increased by an amount of the step in the field element 1, as compared with the form shown in FIG. 7. Accordingly, an effect of reducing the leakage flux can be improved.

Figure 8:
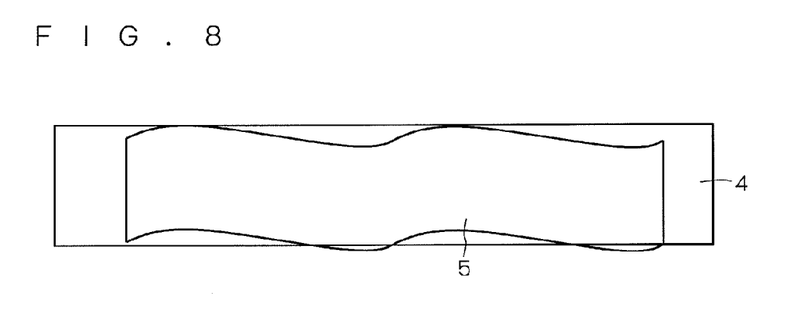
FIG. 8 is a schematic cross-sectional view showing a state in which a field magnet formed of a single permanent magnet cannot be inserted into the penetration hole due to surface accuracy thereof.
Figure 9:
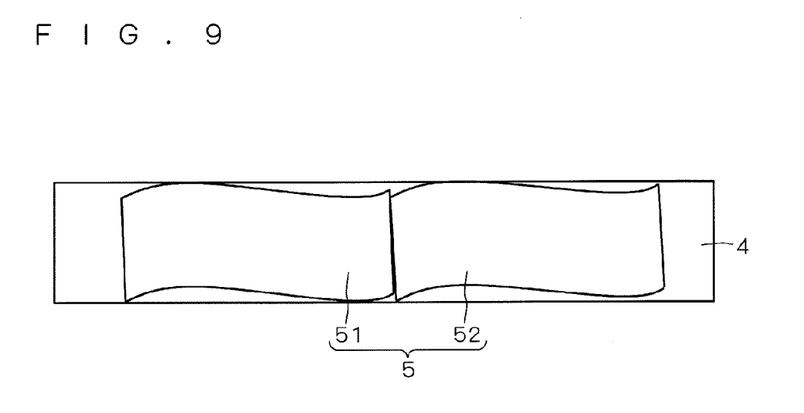
FIG. 9 is a schematic cross-sectional view showing a state in which a field magnet formed of two permanent magnets can be inserted into the penetration hole due to surface accuracy thereof.

Further, the field magnet 5 is formed of a plurality of permanent magnets 51 and 52, and hence accuracy required for the field magnet 5 in terms of shape can be reduced. Specifically, as shown in FIG. 8, there is a case where the field magnet 5 cannot be caused to penetrate through the penetration hole 4 due to undulations on the surface of the field magnet 5 formed of the single permanent magnet. On the other hand, even when undulation accuracy is the same as that of the field magnet 5 shown in FIG. 8, in the case where the field magnet 5 is formed of the permanent magnets 51 and 52, there is a case where the field magnet 5 can be inserted into the penetration hole 4 by tilting the individual permanent magnets 51 and 52 in a predetermined direction in cross section perpendicular to the rotation axis P, as shown in FIG. 9. That is, the accuracy required for the field magnet 5 can be reduced, and accordingly it is possible to reduce a manufacturing cost.

Figure 10:
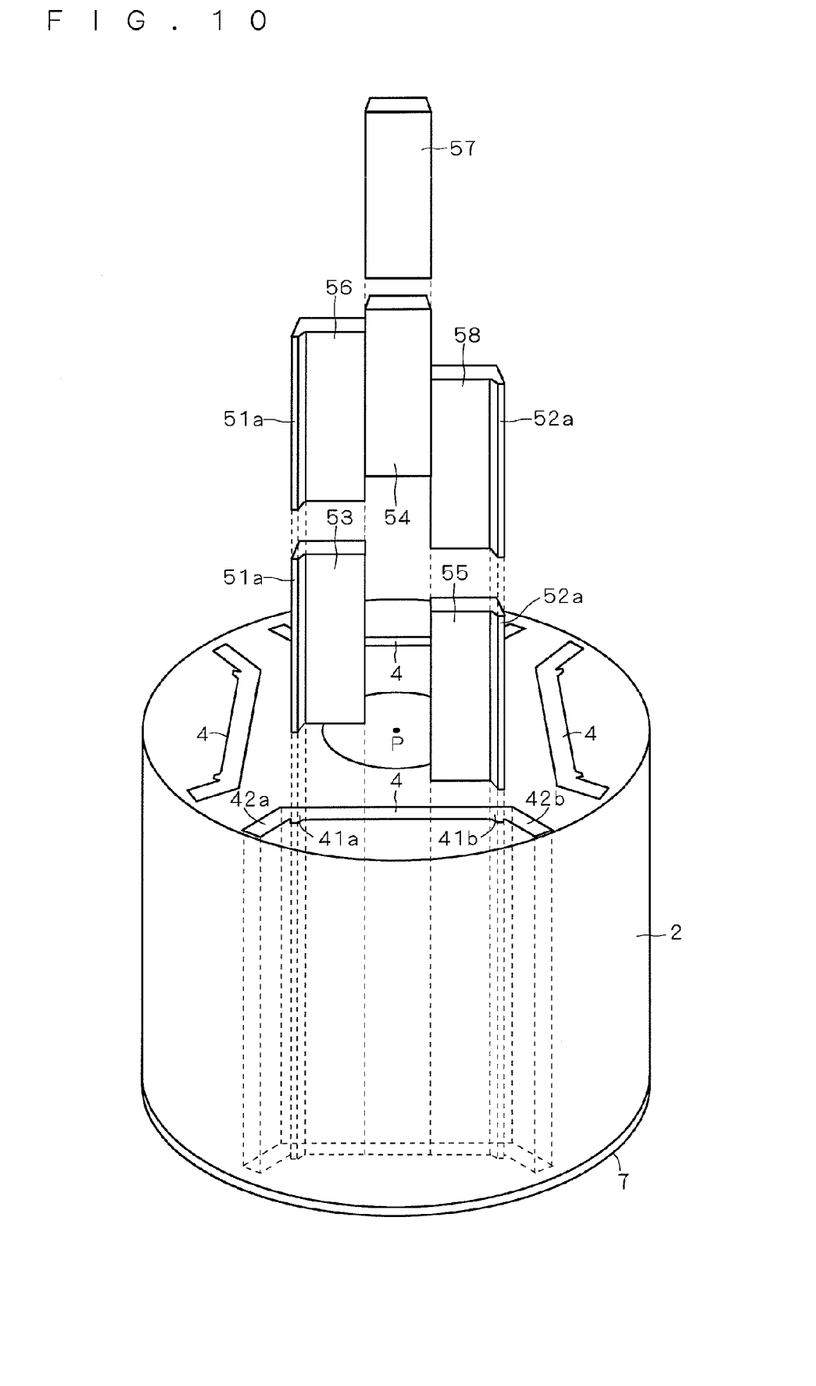
FIG. 10 is a schematic perspective view showing a state in which the field magnet is inserted into the penetration hole.

Note that in this embodiment, the description has been given assuming that the field magnet 5 is formed of the two permanent magnets 51 and 52 in cross section perpendicular to the rotation axis P. However, the field magnet 5 is not limited thereto and has only to be formed of three or less permanent magnets in the cross section. Alternatively, the field magnet 5 may be formed of a plurality of permanent magnets not only in the cross section but also in cross section parallel to the rotation axis P. In other words, the field magnet 5 may be divided in a direction in which the rotation axis P extends. A specific example thereof is shown in FIG. 10 as a schematic perspective view showing a state where the field magnet 5 is caused to penetrate through the penetration hole 4 in the field element 1 in which the field magnet 5 is formed of three permanent magnets in cross section perpendicular to the rotation axis P and those three permanent magnets are each divided into two in the rotation axis direction.

The field magnet 5 is formed of permanent magnets 53 to 58. The permanent magnets 53 to 55 and the permanent magnets 56 to 58 are each disposed in this order in cross section perpendicular to the rotation axis P to form the field magnet 5. The permanent magnets 53 and 56, the permanent magnets 54 and 57, and the permanent magnets 55 and 58 are each disposed in the rotation axis direction so as to be adjacent to each other, thereby forming the field magnet 5. Note that the shape of the field magnet 5 is the same as that of the field magnet 5 shown in FIGS. 1 and 2.

In this case, first, the permanent magnets 53, 55, 56 and 58 positioned on both sides of the field magnet 5 are each caused to penetrate through the penetration hole 4. On this occasion, the permanent magnets 53 and 56 are fitted with the concave portion 41a provided in the penetration hole 4, and the permanent magnets 55 and 58 are fitted with the concave portion 41b provided in the penetration hole 4 to cause to penetrate therethrough. Accordingly, those permanent magnets 53, 55, 56 and 58 are caused to penetrate through the penetration hole 4 at desired positions without being interfering with each other.

Then, the permanent magnets 54 and 57 are caused to penetrate between the permanent magnets 53 and 55 and between the permanent magnets 56 and 58, respectively. On this occasion, the permanent magnets 53, 55, 56 and 58 and the penetration surfaces 4a and 4b serve as a guide which guides the permanent magnets 54 and 57, whereby the penetration of the permanent magnets 54 and 57 can be performed easily. As described above, the field magnet 5 can be caused to easily penetrate through the penetration hole 4 without any interference in the penetration of all the permanent magnets 53 to 58.

In addition, the field magnet 5 is divided also in the direction parallel to the rotation axis P, and thus the accuracy required for the field magnet 5 can be reduced further, leading to a further reduction in manufacturing cost. Alternatively, in the case of the conventional field magnet 9 having the uniform width, the insertion into the penetration hole becomes more difficult as the field magnet is divided into more pieces in the rotation axis direction. However, penetration can be performed with ease in the field element 1.

Note that even in the case where the field magnet 5 is formed of the single permanent magnet, the penetration surfaces 4a and 4b (more specifically, concave portions 41a and 41b) serve as the guide which guides the field magnet 5, with the result that the field magnet 5 can be caused to penetrate through the penetration hole 4 with ease in the same manner. However, the effect of reducing the accuracy required for the field magnet 5 is not produced in this case.

Figure 11:
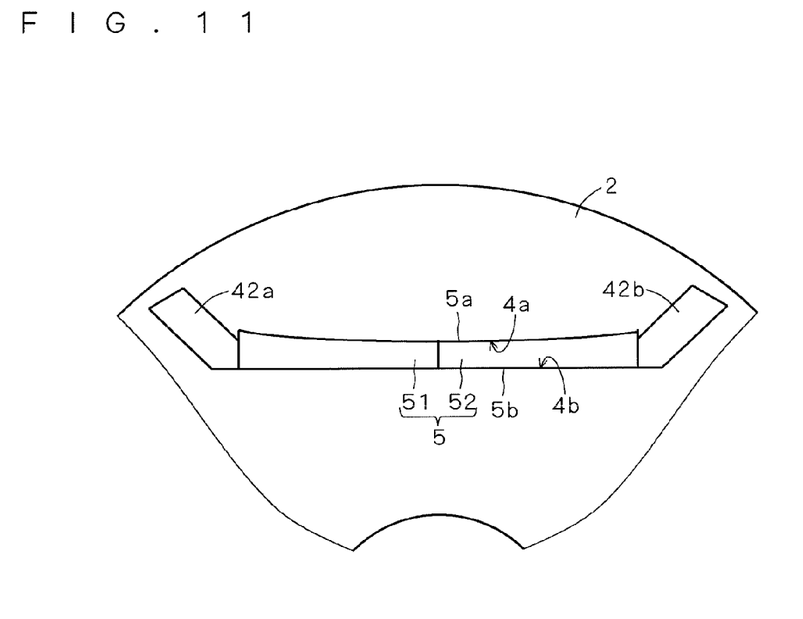
FIG. 11 is a schematic cross-sectional view showing one field magnet and one penetration hole of the field element according to the first embodiment.
Figure 12:
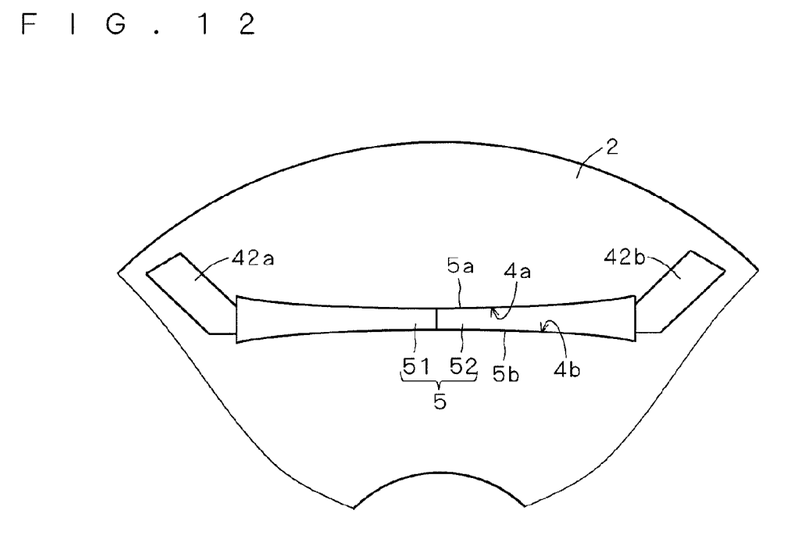
FIG. 12 is another schematic cross-sectional view showing one field magnet and one penetration hole of the field element according to the first embodiment.

Note that the field magnet 5 is not limited to be formed to include the projecting portions 51a and 52a at the both ends thereof, and may be formed so that the width of the field magnet 5 increases in, for example, a monotonically increasing manner from the center toward the both ends of the magnetic pole surface 5a. Specific examples are shown in FIGS. 11 and 12. FIGS. 11 and 12 are schematic cross-sectional views each showing a region of one penetration hole 4 and one field magnet 5 in the field element.

As shown in FIG. 11, the field magnet 5 may have a shape in which the magnetic pole surface 5b is linear with respect to the longitudinal direction and the magnetic pole surface 5a warps toward a perimeter side of the field core 2, from the center to the both sides of the magnetic pole surface 5a. Alternatively, as shown in FIG. 12, both the magnetic pole surfaces 5a and 5b may have a shape so as to warp toward sides opposite to each other, from the center to the both ends thereof. Even in these cases, the penetration surfaces 4a and 4b of the penetration hole 4 cover the magnetic pole surfaces 5a and 5b, respectively, and thus serve as the guide when the field magnet 5 is caused to penetrate through the penetration hole 4. Accordingly, the field magnet 5 can be caused to penetrate through the penetration hole 4 without difficulty.

Second Embodiment

Figure 13:
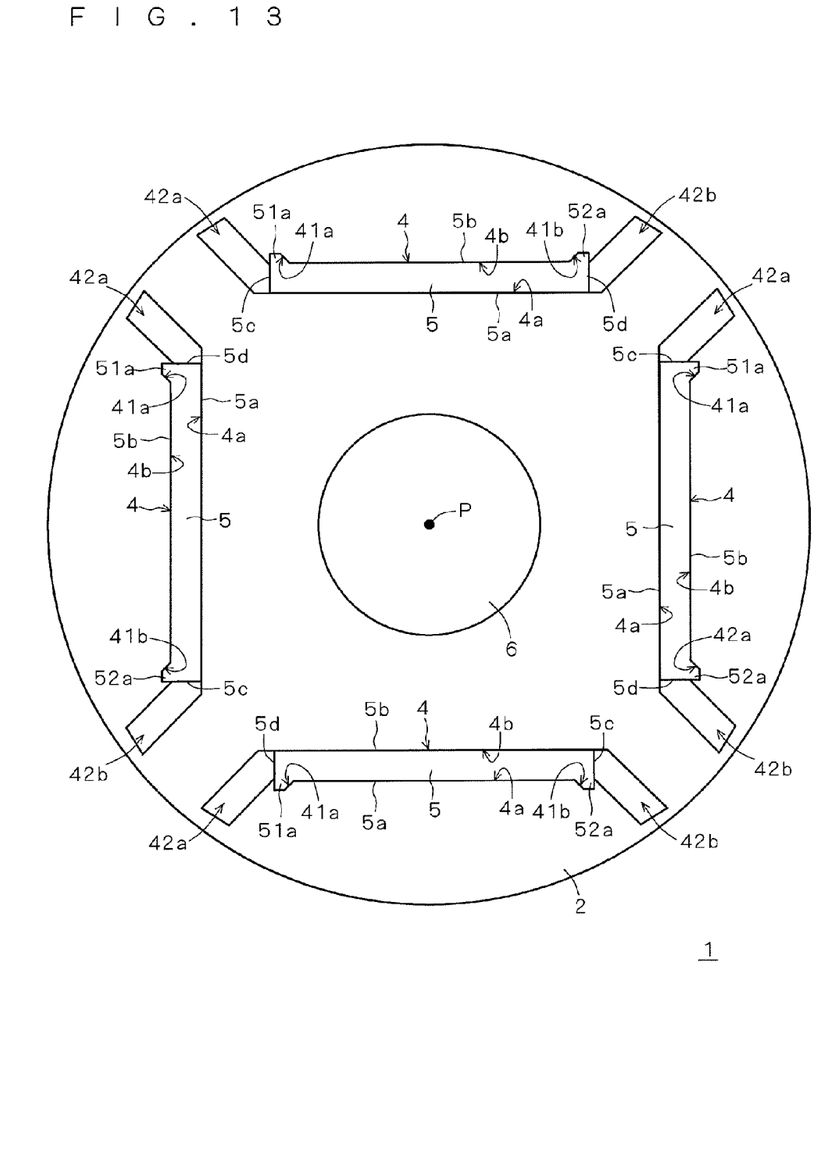
FIG. 13 is a schematic cross-sectional view of a field element according to a second embodiment.

FIG. 13 is a schematic cross-sectional view of a field element according to a second embodiment of the present invention. FIG. 13 shows a schematic configuration of the field element 1 in cross section perpendicular to the rotation axis P. The field element 1 includes the field core 2 and the field magnets 5.

The field element 1 shown in FIG. 13 is different from the field element 1 shown in FIG. 1 in that the field magnet 5 is formed of the single permanent magnet.

According to this field element 1, as in the case where the description has been given with reference to FIGS. 3 to 6 in the first embodiment, the field magnetic flux can be improved and demagnetization resistance can be improved as well. In addition, as in the first embodiment, the penetration surfaces 4a and 4b and the magnetic pole surfaces 5a and 5b serve as the guide which guides the field magnet 5, with the result that the field magnet 5 can be easily inserted into the penetration hole 4.

Further, as described in Patent Document 1, in the case where the permanent magnet is formed of a plurality of unit magnets which pierce from one end to the other end along the rotation axis of the rotor, a gap is generated between the adjacent unit magnets. Meanwhile, the field magnet 5 is formed of continuously integrated permanent magnets in this field element 1. Accordingly, the field magnetic flux can be prevented from decreasing due to the gap between the adjacent unit magnets, and it is possible to prevent noise caused by the plurality of unit magnets colliding with each other.

Figure 14:
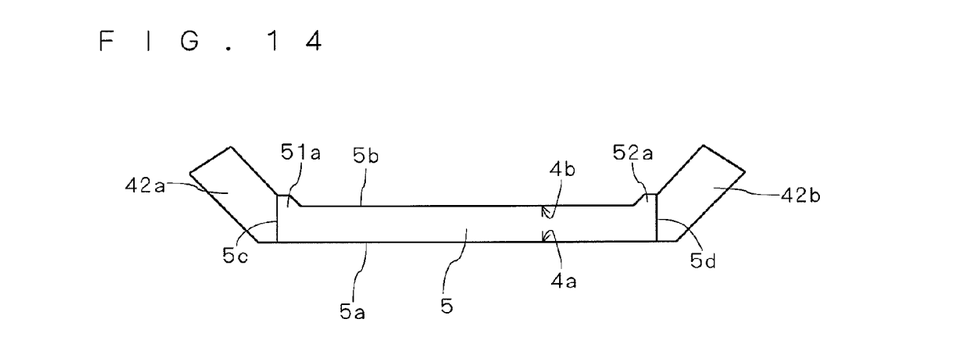
FIG. 14 is a schematic cross-sectional view showing one field magnet and one penetration hole of the field element according to the second embodiment.

The field magnet 5 is composed the single permanent magnet, and accordingly the volumes of the cavity portions 42a and 42b can be increased further while preventing the field magnet 5 from moving in the longitudinal direction. FIG. 14 shows a conceptual configuration of the other example of the penetration hole 4 and the field magnet 5. The penetration hole 4 is in contact with only the magnetic pole surfaces 5a and 5b among surfaces of the field magnet 5 except for surfaces 5c and 5d sandwiched between the magnetic pole surfaces 5a and 5b. In other words, the penetration hole 4 extends to the side opposite to the field magnet 5 while exposing all the surfaces 5c and 5d.

In the thus formed penetration hole 4 and field magnet 5, for example, movement of the field magnet 5 in a right direction of the sheet is blocked by engagement between the surface of the projecting portion 51a on the magnetic pole surface 5b side and the penetration surface 4b being in contact therewith. On the other hand, movement of the field magnet 5 in the left side of the sheet is blocked by the engagement between the surface of the projecting portion 52a on the magnetic pole surface 5b side and the penetration surface 4b being in contact therewith. Therefore, movement of the field magnet 5 in the longitudinal direction can be prevented. In other words, the magnetic pole surfaces 5a and 5b and the penetration surfaces 4a and 4b have a magnet retaining structure for preventing the field magnet 5 from moving in the longitudinal direction.

Therefore, the penetration hole 4 does not need to have a step shape for preventing the field magnet 5 from moving, that is, the step shape (see FIG. 7) on the rotation axis P side or the step shape (see FIG. 1) on the side opposite to the rotation axis P. Accordingly, the surfaces 5c and 5d are all exposed as shown in FIG. 14, and thus an effect of preventing the magnetic flux from flowing between the magnetic pole surfaces 5a and 5b in a short-circuit manner is enhanced, which further improves the effect of reducing the leakage flux.

Figure 15:
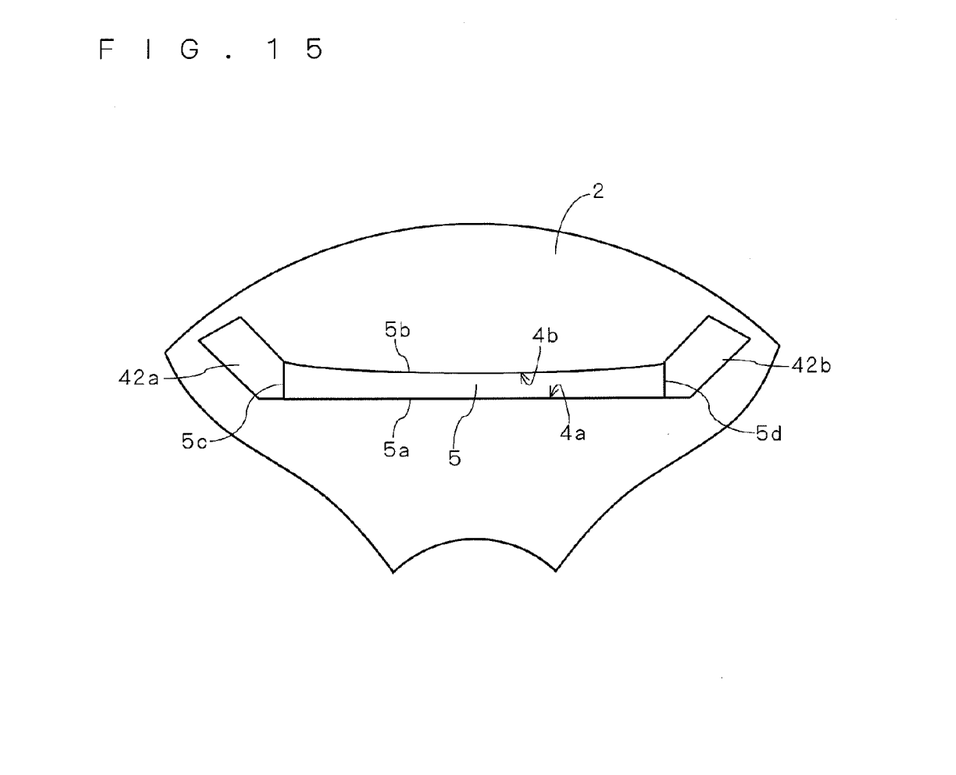
FIG. 15 is another schematic cross-sectional view showing one field magnet and one penetration hole of the field element according to the second embodiment.

In the field element 1 shown in FIG. 15, the cavity portions 42a and 42b expand on the side opposite to the rotation axis P as compared with the field element 1 shown in FIG. 1. Permeabilities of the cavity portions 42a and 42b (=1) are small, and it is possible to reduce the magnetic flux flowing between the both ends of the field magnet 5 from the armature 8 via the field core 2 in the short-circuit manner, thereby improving the demagnetization resistance further.

Figure 16:
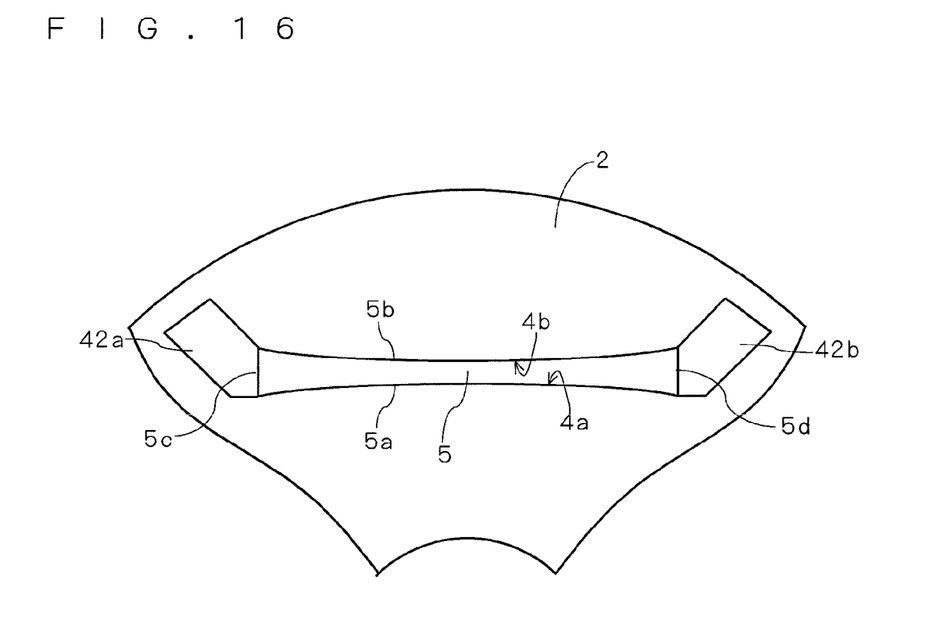
FIG. 16 is a still another schematic cross-sectional view showing one field magnet and one penetration hole of the field element according to the second embodiment.

Note that the field magnet 5 is not limited to have the shape including the projecting portions 51a and 52a at the both ends thereof, and may have a shape so that the width of the field magnet 5 increases from the center to the both ends of the magnetic pole surface 5a in, for example, a monotonically increasing manner. Specific examples thereof are shown in FIG. 15 and FIG. 16. FIG. 15 and FIG. 16 are schematic cross-sectional views showing the region of one penetration hole 4 and one field magnet 5 among the other examples of the field element.

As shown in FIG. 15, the field magnet 5 may have a shape in which the magnetic pole surface 5a is linear with respect to the longitudinal direction and the magnetic pole surface 5b warps toward the perimeter side of the field core 2 from the center to both ends thereof. Alternatively, as shown in FIG. 16, the field magnet 5 may have a shape in which both the magnetic pole surfaces 5a and 5b warp toward sides opposite to each other from the center to the both ends thereof.

Even in those cases, the width at both ends of the field magnet 5 is larger than the width at the center thereof, with the result that the demagnetization resistance can be improved at the both ends. Moreover, the penetration surfaces 4a and 4b of the penetration hole 4 cover the magnetic pole surfaces 5a and 5b, respectively, and thus serve as the guide when the field magnet 5 is caused to penetrate through the penetration hole 4. Accordingly, the field magnet 5 can be caused to penetrate through the penetration hole 4 without difficulty.

Further, in any form shown in FIGS. 15 and 16, the magnetic pole surfaces 5a and 5b and the penetration surfaces 4a and 4b which cover those prevent the field magnet 5 from moving in the longitudinal direction. For this reason, the cavity portions 42a and 42b can be provided while exposing all the surfaces 5c and 5d, and hence the volumes of the cavity portions 42a and 42b can be increased. As a result, the effect of reducing the leakage flux can be increased further. In this case, the areas of the both ends of the field magnet 5 being in contact with the field core 2 can be reduced, and accordingly the demagnetization resistance can be improved further.

Note that the field magnet 5 shown in FIG. 14 can reduce an amount of the permanent magnet forming the field magnet 5. Specific description will be given below. Assuming that the width at the center of the magnetic pole surface 5a is the same, the shapes of the field magnets 5 shown in FIGS. 14, 15 and 16 are compared with each other. The width increases monotonically from the center to the both ends of the magnetic pole surface 5a in the field magnets 5 shown in FIGS. 15 and 16, whereas the field magnet 5 shown in FIG. 14 has a plane portion in which the width thereof is constant from the center to the both ends of the magnetic pole surface. Therefore, a volume of the plane portion in FIG. 14 is smaller than a volume of a portion corresponding to the plane portion in FIGS. 15 and 16. Accordingly, compared with the shape in which the width increases monotonically, it is possible to manufacture the plane portion using a smaller amount of permanent magnet. Thus, the manufacturing cost can be reduced.

While the invention has been shown and described in detail, the foregoing description is in all aspects illustrative and not restrictive. It is therefore understood that numerous modifications and variations can be devised without departing from the scope of the invention.

The invention claimed is:

1. A field element, comprising:
 a field magnet including a first magnetic pole surface having a first polarity on a rotation axis side and a second magnetic pole surface having a second polarity on a side opposite to said rotation axis, wherein said field magnet having a width that is a distance between said first magnetic pole surface and said second magnetic pole surface, wherein said width in a monotonically non-decreasing manner along a longitudinal direction from a center of said first magnetic pole surface toward both ends of said first magnetic pole surface in cross section perpendicular to said rotation axis, said first magnetic pole surface and said second magnetic pole surface being formed of three or less permanent magnets in said cross section; and a field core including a penetration hole including a first penetration surface covering said first magnetic pole surface and a second penetration surface covering said second magnetic pole surface.

2. The field element according to claim 1, wherein:
said field magnet is formed of a plurality of said permanent magnets; and
a boundary between said plurality of said permanent magnets forming said field magnet is positioned between said both ends.

3. The field element according to claim 1, wherein said field magnet is divided into a plurality of said permanent magnets in a direction of said rotation axis.

4. The field element according to claim 2, wherein said field magnet is divided into a plurality of said permanent magnets in a direction of said rotation axis.

5. A field element, comprising:
a field magnet including a first magnetic pole surface having a first polarity on a rotation axis side and a second magnetic pole surface having a second polarity on a side opposite to said rotation axis, wherein said field magnet having a width that is a distance between said first magnetic pole surface and said second magnetic pole surface, wherein said width in a monotonically non-decreasing manner alone a longitudinal direction from a center of said first magnetic pole surface toward both ends of said first magnetic pole surface in cross section perpendicular to said rotation axis, said first magnetic pole surface and said second magnetic pole surface being formed of one permanent magnet in said cross section; and a field core including a penetration hole including a first penetration surface covering said first magnetic surface and a second penetration surface covering said second magnetic pole surface.

6. The field element according to claim 1, wherein:
said second magnetic pole surface includes projecting portions projecting toward a side opposite to the rotation axis at end portions in said longitudinal direction and increasing said width of said field magnet; and
said second penetration surface includes concave portions being fitted with said projecting portions.

7. The field element according to claim 1, wherein said penetration hole further extends to a side opposite to said field magnet from said first penetration surface and said second penetration surface.

8. The field element according to claim 6, wherein said penetration hole further extends to a side opposite to said field magnet from said first penetration surface and said second penetration surface.

* * * * *